(12) United States Patent
Buck et al.

(10) Patent No.: US 12,145,108 B2
(45) Date of Patent: Nov. 19, 2024

(54) SPINNERET

(71) Applicant: GAMBRO LUNDIA AB, Lund (SE)

(72) Inventors: Reinhold Buck, Alleshausen (DE);
Evelyn Grossmann, Esslingen (DE);
Markus Hornung, Nehren (DE);
Markus Loeffler, Hechingen (DE);
Heinrich Behr, Hechingen (DE); Arnd Wochner, Dotternhausen (DE);
Carl-Philipp Scheuermann, Balingen (DE)

(73) Assignee: GAMBRO LUNDIA AB, Lund (SE)

( * ) Notice: Subject to any disclaimer, the term of this patent is extended or adjusted under 35 U.S.C. 154(b) by 209 days.

(21) Appl. No.: 17/786,685

(22) PCT Filed: Dec. 21, 2020

(86) PCT No.: PCT/EP2020/087375
§ 371 (c)(1),
(2) Date: Jun. 17, 2022

(87) PCT Pub. No.: WO2021/130145
PCT Pub. Date: Jul. 1, 2021

(65) Prior Publication Data
US 2022/0339585 A1 Oct. 27, 2022

(30) Foreign Application Priority Data
Dec. 23, 2019 (EP) .................................. 19219557

(51) Int. Cl.
| | |
|---|---|
| *B01D 69/08* | (2006.01) |
| *B01D 71/44* | (2006.01) |
| *B01D 71/68* | (2006.01) |
| *B29C 48/00* | (2019.01) |
| *B29C 48/05* | (2019.01) |

(Continued)

(52) U.S. Cl.
CPC ......... *B01D 69/085* (2013.01); *B01D 71/441* (2022.08); *B01D 71/68* (2013.01); *B29C 48/022* (2019.02); *B29C 48/05* (2019.02); *B29C 48/09* (2019.02); *B29C 48/32* (2019.02); *B29C 48/345* (2019.02); *D01D 5/06* (2013.01); *D01D 5/24* (2013.01); *D01F 6/76* (2013.01); *B01D 2323/42* (2013.01); *B29K 2081/06* (2013.01);
(Continued)

(58) Field of Classification Search
CPC ....... B29C 48/345; D01D 5/32; B01D 69/085
See application file for complete search history.

(56) References Cited

U.S. PATENT DOCUMENTS

| | | | | |
|---|---|---|---|---|
| 3,081,490 A | * | 3/1963 | Heynen | .................... D01D 5/24 |
| | | | | 425/190 |
| 5,480,598 A | * | 1/1996 | Gentile | ................ B01D 69/085 |
| | | | | 425/467 |
| 2022/0168694 A1 | * | 6/2022 | Takazono | ............ D06M 15/263 |

FOREIGN PATENT DOCUMENTS

| | | | | |
|---|---|---|---|---|
| CN | 201883191 U | * | 6/2011 | |
| CN | 106435788 A | * | 2/2017 | ............... D01D 5/24 |

(Continued)

OTHER PUBLICATIONS

PCT Search Report and Written Opinion prepared for PCT Application No. PCT/EP2020/087375, completed Apr. 1, 2021.

*Primary Examiner* — Nahida Sultana
*Assistant Examiner* — Virak Nguon
(74) *Attorney, Agent, or Firm* — Barnes & Thornburg LLP

(57) ABSTRACT

The present disclosure relates to a spinneret for producing hollow fiber membranes in a phase inversion process.

11 Claims, 3 Drawing Sheets

(51) Int. Cl.
    *B29C 48/09*          (2019.01)
    *B29C 48/32*          (2019.01)
    *B29C 48/345*        (2019.01)
    *B29K 81/00*          (2006.01)
    *B29L 31/00*          (2006.01)
    *D01D 5/06*           (2006.01)
    *D01D 5/24*           (2006.01)
    *D01F 6/76*           (2006.01)

(52) U.S. Cl.
    CPC ..... *B29L 2031/755* (2013.01); *D10B 2331/30* (2013.01); *D10B 2331/301* (2013.01)

(56) References Cited

FOREIGN PATENT DOCUMENTS

| | | | |
|---|---|---|---|
| DE | 3022313 | | 12/1980 |
| JP | S5590608 | A | 7/1980 |
| JP | 2005163240 | A * | 6/2005 |

* cited by examiner

SPINNERET

CROSS-REFERENCE TO RELATED APPLICATIONS

This application is a national stage entry under 35 U.S.C. § 371(b) of PCT International Application No. PCT/EP2020/087375, filed Dec. 21, 2020, which claims the benefit of European Patent Application Serial No. 19219557.6, filed on Dec. 23, 2019, the entire disclosures of both of which are incorporated herein by reference.

TECHNICAL FIELD

The present disclosure relates to a spinneret for producing hollow fiber membranes in a phase inversion process.

BACKGROUND OF THE INVENTION

Semipermeable hollow fiber membranes for application in medical devices, e.g., capillary dialyzers and capillary filters, are mostly manufactured using a phase inversion process. Spinnerets having a nozzle with two concentric orifices, an outer ring slit and a central bore, are commonly used. A polymer solution is extruded through the outer ring slit of the nozzle into a precipitation bath, and simultaneously a center fluid is extruded through the inner bore of the nozzle.

A spinning train comprises a plurality of spinnerets implemented in the spinning machines for producing a plurality of hollow fiber membranes which are bundled into a fiber strand. Hundreds of spinnerets are arranged in a spinning head, and each spinneret is individually supplied with the polymer solution and with the center fluid.

A spinning train is an especially designed structure which includes sub-units for precipitating, washing, drying, crimping and collecting the fibers. This train of machines requires heavy investment. Increasing the spinning capacity requires replication of this machinery, and thus replication of the investment.

It is an objective of the present disclosure to provide options for capacity expansion of a spinning train that do not require duplication of the whole equipment of the spinning train and allow for retrofitting of existing spinning trains.

DE 30 22 313 A1 discloses a spinning nozzle for producing a semipermeable hollow fiber having several separate hollow sections which extend along the entire length of the hollow fiber and each have a through-hole. The spinneret has a plurality of mutually independent openings for injecting a first liquid and a corresponding number of annular slots surrounding the individual openings. The ring slots are connected together to form a continuous slit for extrusion of a fiber-forming material.

U.S. Pat. No. 3,081,490 A discloses a spinneret for the production of hollow filaments consists of two circular plates and firmly held together by means of four bushed screws. A first plate is provided with a central spinning orifice, with two alignment or registering bores for dowels and with a cylindrical duct or bore which is coaxial with the spinning orifice and is of greater diameter. The duct extends from the upper surface of the first plate to the upper end of the spinning orifice. The underside of the second plate is provided with a circular recess which forms a supply chamber for the spinning solution or melt and with four bores which terminate in the recess and through which spinning solution or melt is supplied to the recess. A supply passage opening into a bore is drilled in the second plate for the supply of a gaseous or liquid medium to the interior of a hollow pin via an opening. The pin, terminating in a capillary tube is secured to the bore of the second plate by means of a hollow screw and is concentrically located in the cylindrical bore which is of greater diameter than the pin. A spinneret having a similar construction but having six spinning orifices is also described.

JP S55 90608 A discloses a spinneret having a high concentricity of orifices and water or gas outlets. The spinneret is obtained by machining the periphery of the nozzle tip and the inner surface of the polymer outlet simultaneously to form an orifice, and by boring and communicating a blind hole for water or a gas. A nozzle having a blind hole for water or a gas at the center and a plurality of polymer ports is fixed in a holder with a central polymer outlet.

SUMMARY OF THE INVENTION

A twin spinneret is provided that can replace spinnerets (mono-spinnerets) in spinning machines to double their capacity. Instead of one hollow fiber per spinneret, the twin spinneret delivers two hollow fibers per spinneret. As the twin spinneret has the same installation dimensions as the mono-spinneret, fiber production capacity of a spinning machine can be doubled. The basic design of the machinery re-mains unchanged. As only spare parts like spinnerets and polymer pumps need to be exchanged, a retrofit of an existing spinning train requires little investment.

SHORT DESCRIPTION OF THE DRAWINGS

DETAILED DESCRIPTION

Figure 1:
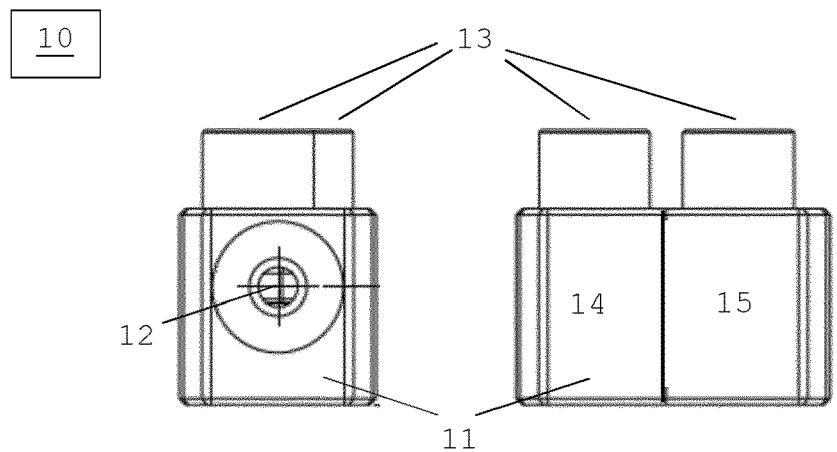
FIG. 1 shows a side view and a front view of an exemplary embodiment of the spinneret of the present disclosure.

A spinneret is provided which produces two hollow fibers per spinneret (twin spinneret) instead of only one hollow fiber as in known spinnerets (mono-spinneret). The twin spinneret has the same installation dimensions as a mono-spinneret and can be used to retrofit existing spinning machines.

The spinneret of the present disclosure features two nozzles, each having two concentric orifices, an outer ring slit and a central orifice. The outer ring slit of each nozzle is connected to a compartment for a polymer solution in the spinneret, the central orifice of each nozzle is connected to a reservoir for a center fluid via a capillary.

The compartment for a polymer solution is connected to a feed port for a polymer solution located in a side wall of the spinneret.

The capillaries are each connected to a reservoir for a center fluid in the spinneret which is in turn connected to a feed port for a center fluid located on the upper side of the spinneret. In a further embodiment, the two reservoirs for a center fluid are connected to a single common feed port for a center fluid. In another embodiment, the two capillaries are connected to a single common reservoir for a center fluid.

In one embodiment, the longitudinal axes of the two nozzles of the twin spinneret are offset from the vertical middle plane (parallel to the front side and the back side) of the spinneret. In other words, the longitudinal axes of the two nozzles lie in a common plane which is not parallel to any of the side walls of the spinneret. This ensures a greater distance between the two hollow fibers produced with one twin spinneret. In another embodiment, the axes of the two nozzles are both located in the vertical middle plane of the spinneret.

In one embodiment, the spinneret is comprised of two separate building blocks which are assembled to form the spinneret. The first building block is a spinneret body defining the outer wall of the compartment for a polymer solution, the feed port for the polymer solution, and the outer wall of the ring slits of the nozzles. The spinneret body has two openings on its upper side, into which the second building block is inserted. The second building block defines the inner wall of the compartment for a polymer solution, the capillaries, at least one reservoir for a center fluid, and at least one feed port for a center fluid.

In a further embodiment, the spinneret body is comprised of two subunits which each comprise one of the nozzles of the spinneret. Each subunit has a cylindrical bore in its upper side, which on assembly of the spinneret engages a corresponding part of the second building block of the spinneret. One of the subunits features a feed port for a polymer solution in one of its side walls. The two subunits are joined laterally. The side walls of both subunits comprise matching openings at the interface of the subunits. In one embodiment, a tubular connector is positioned in the tubular pipe formed on joining the subunits.

In a further embodiment, the second building block is comprised of two subunits ("nozzle inserts") which each comprise a capillary, a reservoir for a center fluid, and a feed port for a center fluid. In one embodiment, the subunits are rotationally symmetric.

Consequently, the spinneret of the present disclosure comprises two, three, or four subunits. The modular design of the spinneret greatly facilitates maintenance of the spinneret as well as exchange and replacement of defective or worn parts.

The spinneret of the present disclosure contains only one feed port for a polymer solution. The feed port supplies both nozzles of the spinneret with polymer solution. The feed port is connected to a compartment for a polymer solution which is defined by the inner wall of the spinneret body and the outer surface of the nozzle inserts. This compartment for a polymer solution comprises three portions, two rotationally-symmetrical shells formed around the nozzle inserts, and a tubular duct connecting the shells. The tubular duct is aligned with the orifice of the feed port and has the same inner diameter. The diameter of each shell, as well as the distance between the walls forming the shell, is largest at the level of the tubular duct and decreases towards the nozzles of the spinneret, i.e. the bottom of the spinneret. Both shells have the same form and volume.

It has been found that, although the spinneret of the present disclosure has only one feed port for a polymer solution which supplies both nozzles, instead of one feed port per nozzle, both nozzles have identical output characteristics. As a result, the hollow fibers produced by the nozzles of the twin spinneret have identical dimensions (within measurement accuracy). This is due to the special form of the compartment for a polymer solution which yields uniform flow of the polymer solution through the compartment.

It is a further advantage of the spinneret of the present invention that only one pump for polymer solution is required per spinneret, i.e., compared to a conventional spinning machine producing the same number of fibers, only half the number of pumps is required.

The spinneret of the present disclosure significantly reduces space requirements for spinning machines. Alternatively, spinning capacity of a spinning train can be doubled without requiring further space, by replacing conventional spinnerets with the twin spinnerets of the present disclosure.

The present disclosure also provides a process for the production of hollow fiber membranes, comprising feeding a polymer solution to the feed port for a polymer solution of the spinneret of the present device, simultaneously feeding a center solution to at least one feed port for a center solution of the spinneret of the present disclosure, extruding the polymer solution through the outer ring slits of both nozzles of the spinneret of the present disclosure, and simultaneously extruding the center fluid through the central orifice of both nozzles of the spinneret of the present disclosure.

Suitable polymer solutions and suitable center fluids for the production of semipermeable hollow fiber membranes are well known in the art. For instance, a solution comprising 1) at least one polysulfone, polyethersulfone, or polyarylethersulfone, and 2) at least one polyvinylpyrrolidone dissolved in 3) a mixture of N-methyl-2-pyrrolidone (NMP) and water may be used as the polymer solution, and a mixture of water and NMP may be used as the center fluid.

The spinneret of the present disclosure will now be further explained by referring to the accompanying figures.

FIG. 1 shows a side view and a front view of an exemplary embodiment of the spinneret 10 of the present disclosure. A spinneret body 11 features a feed port 12 in one of its side walls. Two feed ports 13 for a center fluid are present on the upper side of the spinneret body 11. The spinneret body is comprised of a first subunit 14 and a second subunit 15 attached to each other via a sidewall of each subunit.

Figure 2:
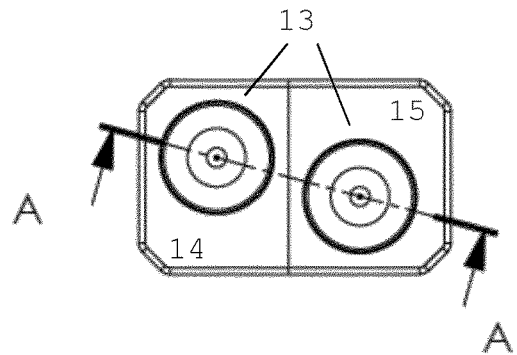
FIG. 2 is a top view of the spinneret of FIG. 1.

FIG. 2 is a top view of the spinneret of FIG. 1, showing the two feed ports 13 for a center fluid and the first subunit 14 and the second subunit 15 attached to each other via a sidewall of each subunit.

Figure 3:
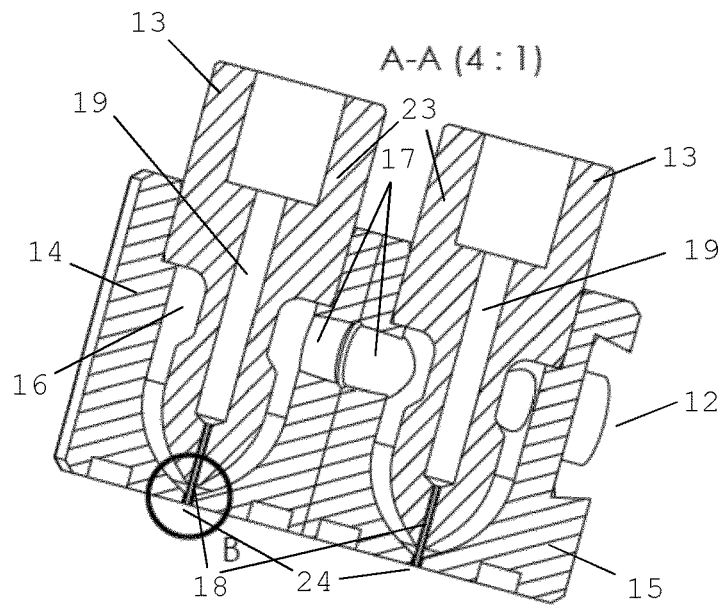
FIG. 3 is a sectional view along the line A-A shown in FIG. 2.

FIG. 3 is a sectional view along the line A-A shown in FIG. 2, i.e., a section through the central axes of the feed ports 13 for a center fluid. As shown in FIG. 3, the spinneret is comprised of four subunits or components 14, 15, 23. The subunits 14 and 15 together form the spinneret body 11. Two identical nozzle inserts 23 are mounted in cylindrical openings of the spinneret body subunits 14 and 15, respectively. Each nozzle insert 23 features a capillary 18, a reservoir 19 for a center fluid, and a feed port 13 for a center fluid. At the interface of the subunits 14 and 15, matching connecting orifices 17 are present, together forming a duct for a polymer solution between the subunits 14 and 15. The inner wall of the subunits 14 and 15 and the outer surface of the nozzle inserts 23 together define a compartment 16 for a polymer solution.

Figure 4:
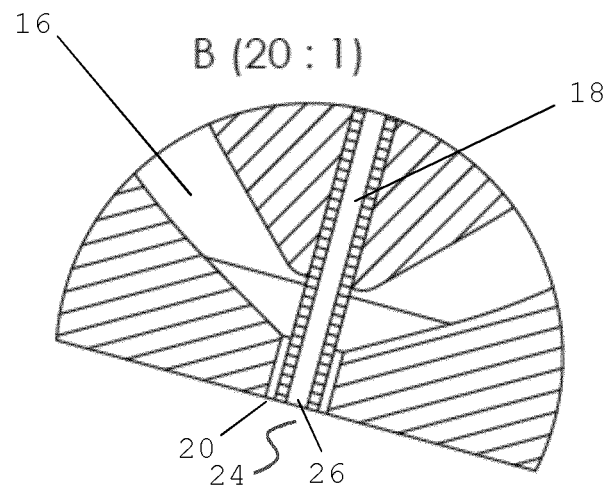
FIG. 4 is a detail view of section B shown in FIG. 3.

FIG. 4 is a detail view of section B shown in FIG. 3. It shows parts of the compartment 16 for a polymer solution and of the capillary 18 for a center fluid. A nozzle 24 having an outer ring slit 20 and a central orifice 26 is defined by the inner surface of the compartment 16 and the capillary 18.

Figure 5:
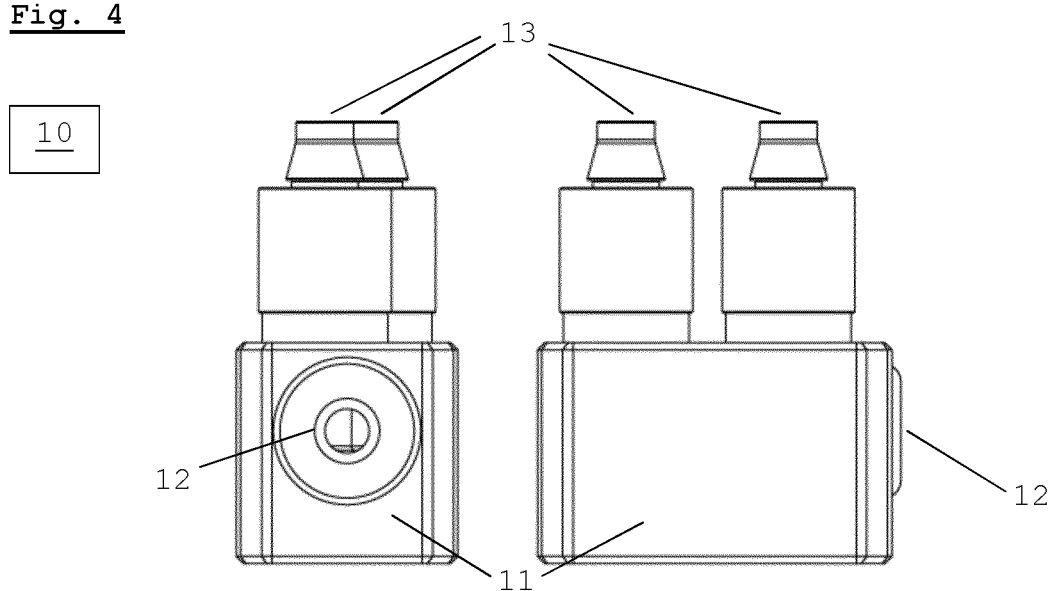
FIG. 5 shows a side view and a front view of another exemplary embodiment of the spinneret of the present disclosure.

FIG. 5 shows a side view and a front view of another exemplary embodiment of the spinneret 10 of the present disclosure. A spinneret body 11 features a feed port 12 in one of its side walls. Two feed ports 13 for a center fluid are present on the upper side of the spinneret body 11. The spinneret body is comprised of a single piece.

Figure 6:
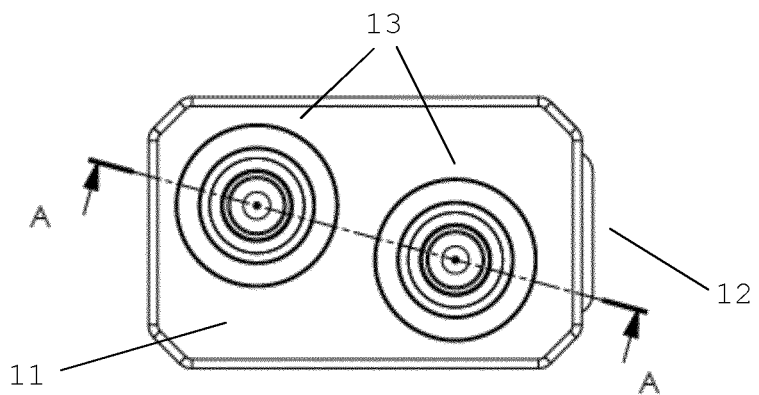
FIG. 6 is a top view of the spinneret of FIG. 5.

FIG. 6 is a top view of the spinneret of FIG. 5, showing the two feed ports 13 for a center fluid and the feed port 12 for a polymer solution.

Figure 7:
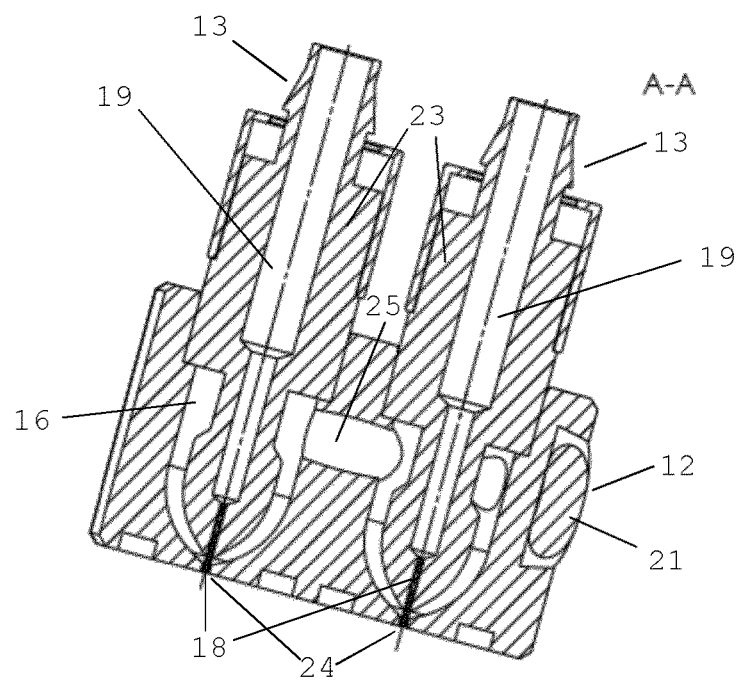
FIG. 7 is a sectional view along the line A-A shown in FIG. 6.

FIG. 7 is a sectional view along the line A-A shown in FIG. 6, i.e., a section through the central axes of the feed ports 13 for a center fluid. The spinneret shown in FIG. 7 is comprised of three subunits or components 11, 23. Two identical nozzle inserts 23 are mounted in cylindrical openings of the spinneret body 11. Each nozzle insert 23 features a capillary 18, a reservoir 19 for a center fluid, and a feed port 13 for a center fluid. The inner wall of the spinneret body 11 and the outer surface of the nozzle inserts 23 together define a compartment 16 for a polymer solution. As can be seen from FIG. 7, the compartment 16 for a polymer solution comprises three portions. The portions formed around the nozzle inserts 23 are rotationally-symmetrical shells, the diameter of the shell decreasing towards the nozzle 24. The two portions of the compartment 16 formed around the nozzle inserts 23 are connected via a tubular duct 25. A sealing ring (O-ring) 21 is positioned around the feed duct 12 for a polymer solution.

Figure 8:
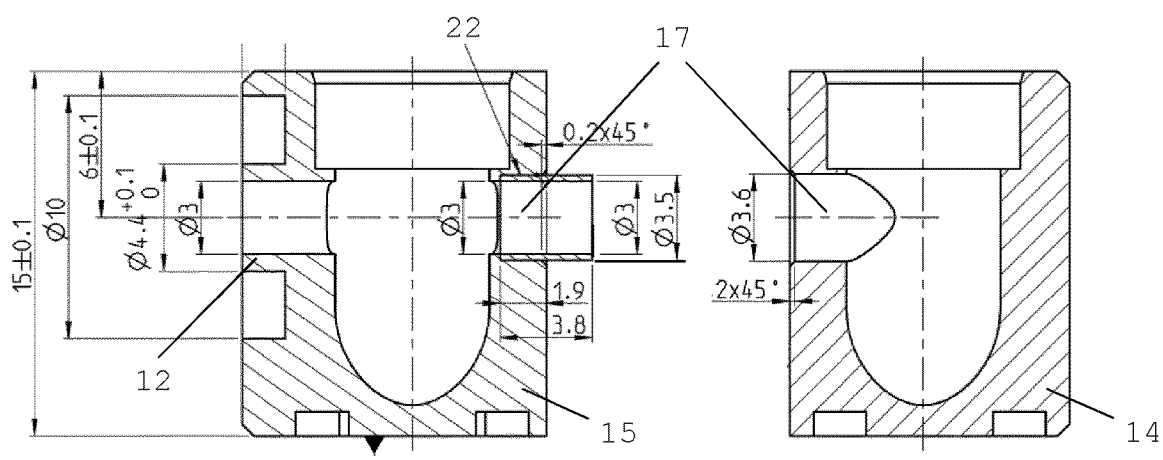
FIG. 8 is an exploded cross-sectional view of parts of the spinneret shown in FIGS. 1-3.

FIG. 8 is an exploded cross-sectional view of parts of the spinneret 10 shown in FIGS. 1-3. FIG. 8 shows a sectional view along the vertical middle plane (in-between the frontside and the backside of the spinneret) of subunits 14 and 15 of the spinneret body 11. The orientation of the subunits is reversed compared to FIGS. 1-3. Dimensions are given in mm. As the center axes of the nozzles of the spinneret do not lie in the vertical middle plane, the nozzles are not visible in FIG. 8.

A feed port 12 for a polymer solution is integrated in one side wall of subunit 15, a connecting orifice 17 is located on the opposite side wall of subunit 15. The connecting orifice 17 is aligned with the opening of the feed port 12. Subunit 14 features a connecting orifice 17 aligned with the connecting orifice 17 of subunit 15 and having the same diameter.

A connecting tube 22 having an inner diameter which matches the inner diameter of the feed port 12 and having an outer diameter which matches the inner diameter of the connecting orifices 17 of subunits 14 and 15, is mounted in the connecting orifice 17 of subunit 15. The length of connector tube 22 is equal to the sum of the bore lengths of the connecting orifices 17 of subunits 14 and 15. The protruding portion of connector tube 22 can be plugged into the connecting orifice 17 of subunit 14 on assembly of the spinneret body 11, forming a duct having the same inner diameter as the feed port 12. In one embodiment, the connector tube 22 is fastened within the connecting orifices 17 using an adhesive.

LIST OF REFERENCE SIGNS 10 spinneret
11 spinneret body
12 feed port for polymer solution
13 feed port for center solution
14 first body subunit
15 second body subunit
16 chamber for polymer solution
17 connecting orifice
18 capillary
19 reservoir for center solution
20 ring slit
21 sealing ring
22 connector tube
23 nozzle insert
24 nozzle
25 duct
26 central orifice

The invention claimed is:

1. A spinneret for producing hollow fiber membranes, comprising two nozzles, wherein each nozzle comprises an outer ring slit and a central orifice,
   wherein the outer ring slits of the two nozzles are in fluid communication with a compartment for a polymer solution,
   wherein the spinneret comprises a spinneret body and two nozzle inserts having identical dimensions and each comprising a capillary, a reservoir for a center fluid, and a feed port for a center fluid,
   wherein the spinneret comprises a single feed port for a polymer solution located in a side wall of the spinneret and connected to the compartment for a polymer solution, characterized in that the feed port for the polymer solution is connected to the compartment defined by the inner wall of the spinneret body and the outer surface of the nozzle inserts,
   wherein the compartment comprises a first rotationally-symmetrical shell formed around a first nozzle insert, a second rotationally-symmetrical shell formed around a second nozzle insert, and a tubular duct connecting the first rotationally-symmetrical shell and the second rotationally-symmetrical shell aligned with the orifice of the feed port for the polymer solution and having the same inner diameter as the feed port for the polymer solution,
   wherein each capillary is connected to a separate reservoir for the center fluid not in fluid communication with the other reservoirs and which in turn is connected to a separate feed port for the center fluid.

2. The spinneret of claim 1, wherein each central orifice is a mouth of the capillary connected to the reservoir for the center fluid.

3. The spinneret of claim 1, wherein the longitudinal axes of the two nozzles lie in a common plane which is not parallel to any of the side walls of the spinneret.

4. The spinneret of claim 1, wherein the spinneret body comprises a first subunit and a second subunit, wherein the second subunit comprises the feed port for the polymer solution.

5. The spinneret of claim 4, wherein the first subunit and the second subunit are joined laterally.

6. The spinneret of claim 5, wherein the first subunit and the second subunit have matching orifices in the sidewall adjacent to the interface of the joined subunits.

7. A process for the production of hollow fiber membranes, said method comprising feeding a polymer solution to the feed port for the polymer solution of the spinneret of claim 1, and
   simultaneously feeding a center fluid to at least one feed port for the center fluid of the spinneret of claim 1;
   extruding the polymer solution through the outer ring slits of both nozzles of the spinneret of claim 1; and
   simultaneously extruding the center fluid through the central orifices of both nozzles of the spinneret of claim 1.

8. The process of claim 7, wherein the polymer solution comprises i) a polysulfone, a polyethersulfone, or a polyarylethersulfone; and ii at least one polyvinylpyrrolidone.

9. The process of claim 8, wherein the polymer solution comprises iii) N-methyl-2-pyrrolidone.

10. The process of claim 9, wherein the polymer solution comprises water.

11. The process of claim 7, wherein the center fluid comprises water.

* * * * *